US011520856B2

(12) United States Patent
Baskaran et al.

(10) Patent No.: US 11,520,856 B2
(45) Date of Patent: *Dec. 6, 2022

(54) SYSTEMS AND METHODS FOR SELECTIVE EXPANSIVE RECURSIVE TENSOR ANALYSIS

(71) Applicant: QUALCOMM TECHNOLOGIES, INC., San Diego, CA (US)

(72) Inventors: Muthu M. Baskaran, Old Tappan, NJ (US); David Bruns-Smith, Brooklyn, NY (US); James Ezick, Canonsburg, PA (US); Richard A. Lethin, New York, NY (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,772

(22) Filed: Nov. 2, 2020

(65) Prior Publication Data

US 2021/0294876 A1 Sep. 23, 2021

Related U.S. Application Data

(63) Continuation of application No. 15/375,620, filed on Dec. 12, 2016, now Pat. No. 10,824,693.

(60) Provisional application No. 62/265,715, filed on Dec. 10, 2015.

(51) Int. Cl.
*G06F 17/16* (2006.01)
(52) U.S. Cl.
CPC .................. *G06F 17/16* (2013.01)

(58) Field of Classification Search
CPC ...................................................... G06F 17/16
See application file for complete search history.

(56) References Cited

U.S. PATENT DOCUMENTS

| 9,471,377 | B2 | 10/2016 | Baskaran et al. |
| 9,480,583 | B2 | 11/2016 | Aksenova et al. |
| 10,824,693 | B2 | 11/2020 | Baskaran et al. |
| 2013/0114092 | A1 | 5/2013 | Maltz et al. |

(Continued)

OTHER PUBLICATIONS

Baskaran M., et al., "Efficient and Scalable Computations with Sparse Tensors," in IEEE High Performance Extreme Computing Conference, Waltham, MA, Sep. 2012, 6 pages.

(Continued)

*Primary Examiner* — Matthew D Sandifer
(74) *Attorney, Agent, or Firm* — Seyfarth Shaw LLP

(57) ABSTRACT

A system for performing tensor decomposition in a selective expansive and/or recursive manner, a tensor is decomposed into a specified number of components, and one or more tensor components are selected for further decomposition. For each selected component, the significant elements thereof are identified, and using the indices of the significant elements a sub-tensor is formed. In a subsequent iteration, each sub-tensor is decomposed into a respective specified number of components. Additional sub-tensors corresponding to the components generated in the subsequent iteration are formed, and these additional sub-tensors may be decomposed further in yet another iteration, until no additional components are selected. The mode of a sub-tensor can be decreased or increased prior to decomposition thereof. Components likely to reveal information about the data stored in the tensor can be selected for decomposition.

19 Claims, 5 Drawing Sheets

(56) References Cited

U.S. PATENT DOCUMENTS

| | | |
|---|---|---|
| 2014/0249762 A1 | 9/2014 | Alter |
| 2015/0198584 A1 | 7/2015 | Rajwa et al. |
| 2015/0296214 A1 | 10/2015 | Mahfoodh et al. |
| 2016/0013773 A1 | 1/2016 | Dourbal |
| 2019/0317945 A1 | 10/2019 | Ezick et al. |

OTHER PUBLICATIONS

Baskaran M., et al., "Low-overhead Load-balanced Scheduling for Sparse Tensor Computations," in IEEE High Performance Extreme Computing Conference, Waltham, MA, Sep. 2014, 6 pages.

Cai J., et al., "Optimization of Symmetric Tensor Computations," in IEEE High Performance Extreme Computing Conference, Waltham, MA, Sep. 2015, 7 pages.

Carlson A., et al., "Toward an Architecture for Never-Ending Language Learning," in Proceedings of the Twenty-Fourth AAAI Conference on Artificial Intelligence, ser. AAAI'10. AAAI Press, 2010, 8 Pages, [Online]. Available: http://dl.acm.org/citation.cfm?id=2898607.2898816.

Chen D., et al., "Nonnegativity Constraints in Numerical Analysis," in Symposium on the Birth of Numerical Analysis, 2007, pp. 109-139.

Chi E.C., et al., "On Tensors, Sparsity, and Nonnegative Factorizations," SIAM Journal on Matrix Analysis and Applications, vol. 33, No. 4, 2012, pp. 1272-1299, arXiv: 1304.4964 [math.NA], Dec. 2011. [Online]. Available: http://arxiv.org/abs/1112.2414.

Choi J.H., et al., "DFacTo: Distributed Factorization of Tensors," in Advances in Neural Information Processing Systems 27, Z. Ghahramani, M. Welling, C. Cortes, N. D. Lawrence, and K. Q. Weinberger, Eds. Curran Associates, Inc., 2014, pp. 1-9. [Online]. Available: http://papers.nips.cc/paper/5395-dfacto-distributedfactorization-of-tensors.pdf.

Gorlitz O., et al., "Pints: Peer-to-Peer Infrastructure for Tagging Systems," in IPTPS, 2008, 6 pages.

Kaya O., et al., "Scalable Sparse Tensor Decompositions in Distributed Memory Systems," in Proceedings of the International Conference for High Performance Computing, Networking, Storage and Analysis, ser. SC '15, New York, NY, USA: ACM, 2015, 11 Pages, [Online]. Available: http://doi.acm.org/10.1145/2807591.2807624.

Kolda T.G., et al., "Tensor Decompositions and Applications," SIAM Review, vol. 51, No. 3, Aug. 5, 2009, pp. 455-500.

Smith S., et al., "A Medium-Grained Algorithm for Distributed Sparse Tensor Factorization," in Parallel and Distributed Processing Symposium (IPDPS), IEEE, 2016, 10 pages.

Tensor X

No. of modes:   N = 4

Mode sizes:     $S_1=10$; $S_2=20$; $S_3=5$; $S_4=8$

Index ranges:   $I_1=\{1 \ldots 10\}$; $I_2=\{1 \ldots 20\}$;

$I_3=\{1 \ldots 5\}$; $I_4=\{1 \ldots 8\}$

Component C1:

| Mode | 1 | 2 | 3 | 4 |
|---|---|---|---|---|
| Indices of significant elements | 1, 4, 7 | 2, 3, 12 | 5, 6 | 8 |
| No. of significant elements | $S_1'=3$ | $S_2'=3$ | $S_3'=2$ | $S_4'=1$ |

Mapping:

| Index Tuple for X' | Index Tuple for X |
|---|---|
| (1,1,1,1) | (1,2,5,8) |
| (1,1,2,1) | (1,2,6,8) |
| (1,2,1,1) | (1,3,5,8) |
| (1,2,2,1) | (1,3,6,8) |
| (1,3,1,1) | (1,12,5,8) |
| (1,3,2,1) | (1,12,6,8) |
| (2,1,1,1) | (4,2,5,8) |
| ⋮ | ⋮ |
| (3,3,2,1) | (7,12,6,8) |

FIG. 3A

| Index Tuple for X″ | Index Tuple for X′ | Index Tuple for X |
|---|---|---|
| (1,1,1) | (1,1,{1,2},1) | (1,2,{5,6},8) |
| (1,2,1) | (1,2,{1,2},1) | (1,3,{5,6},8) |
| (1,3,1) | (1,3,{1,2},1) | (1,12,{5,6},8) |
| (2,1,1) | (2,1,{1,2},1) | (4,2,{5,6},8) |
| ⋮ | | ⋮ |
| (3,3,1) | (3,3,{1,2},1) | (7,12,{5,6},8) |

FIG. 3B

FIG. 4
CP Decomposition:
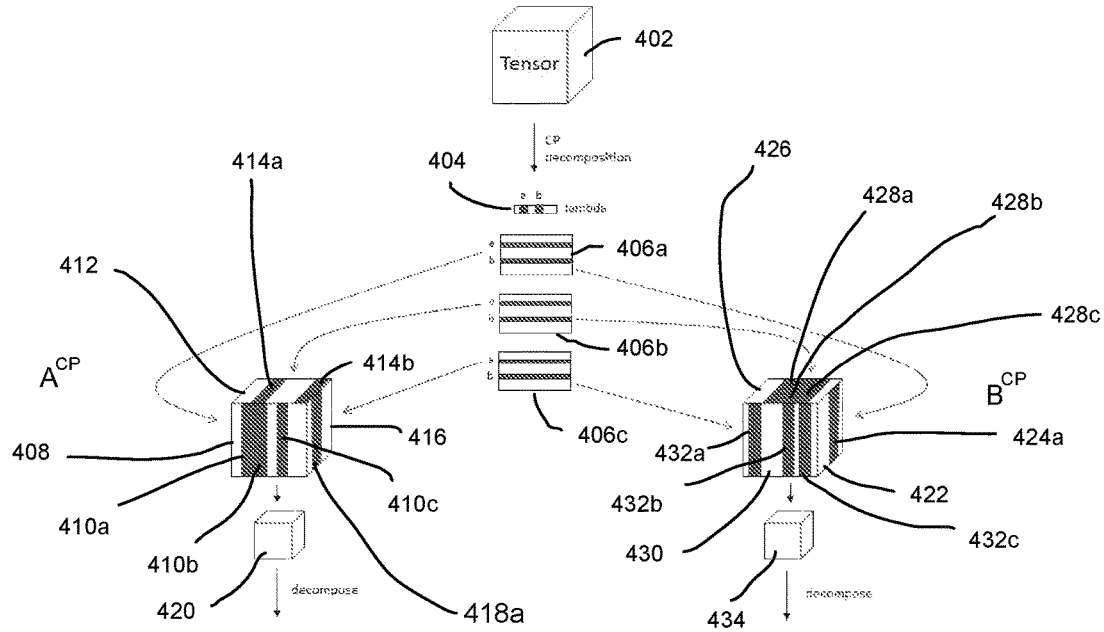
Tucker Decomposition:
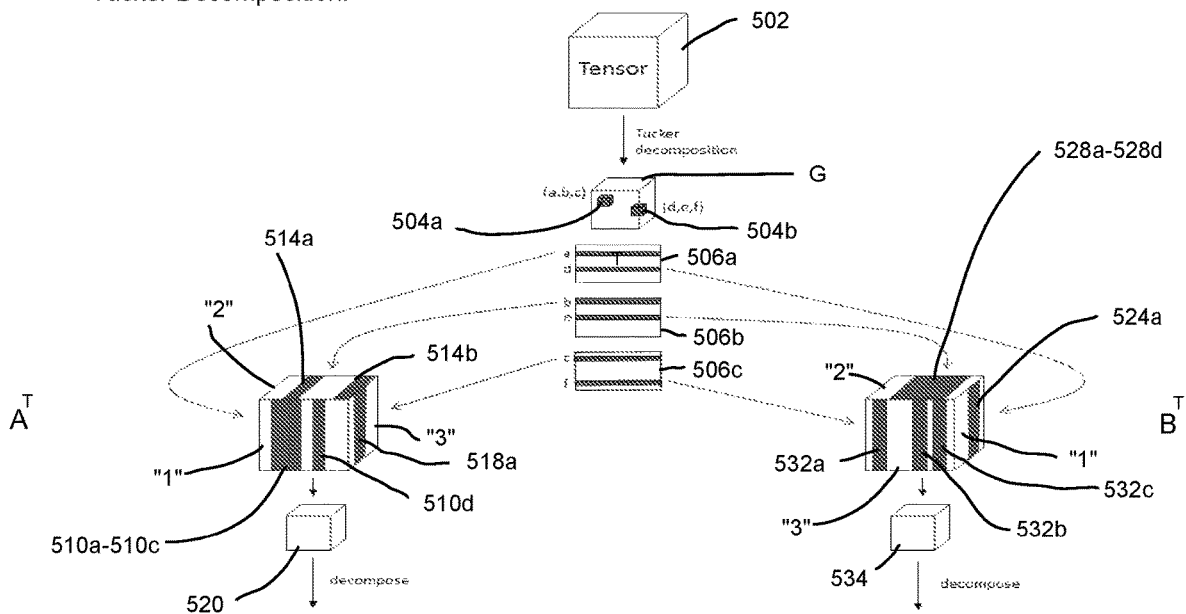
FIG. 5

SYSTEMS AND METHODS FOR SELECTIVE EXPANSIVE RECURSIVE TENSOR ANALYSIS

CROSS-REFERENCE TO RELATED PATENT APPLICATIONS

This application is a continuation of U.S. patent application Ser. No. 15/375,620, filed Dec. 12, 2016, which claims benefit of priority to and benefit of U.S. Provisional Patent Application Ser. No. 62/265,715 entitled "Systems and Methods for Selective Expansive Recursive Tensor Analysis," filed on Dec. 10, 2015, the contents of each of which is incorporated herein by reference in its entirety.

FIELD OF THE INVENTION

This disclosure generally relates to techniques for facilitating data analysis using tensors and, in particular, to techniques for efficient decomposition of tensors.

BACKGROUND

In computerized data analysis, large sets of data are often manipulated using tensors. A tensor, in general, is a multi-dimensional array. The dimensions of a tensor are also called modes, and the number of modes can be any number e.g., 2, 3, 5, 8, 10, 15, 20, etc. The number of tensor elements in each mode (also called the number or rows corresponding to a mode, or mode size) can be the same or different across different modes. Typically, the size of one or more modes is different from the size of another mode. In some tensors each mode has a different size. The mode size can be any number e.g., 1; 6; 50; 100; 2,000; 14,000; 60,000; a few hundred thousand, a million, tens of millions, etc.

Each tensor element can be identified using a set of indices where each index corresponds to a particular mode. The tensor element can be any value including numbers, characters, strings, and combinations thereof. In general, a tensor having N modes can be represented as X: $S_1 \times S_2 \times \ldots \times S_N$, where $S_k$ is the size of the k-th mode. An element of the tensor X can be identified as $x(i_1, i_2, \ldots, i_N)$ where $i_k$ is the index along the k-th mode and, as such, $i_k \in [1, S_k]$, if the starting index is 1. If the starting index is 0, $i_k \in [0, (S_k-1)]$.

The different dimensions or modes of a tensor can represent different attributes of data. For example, in a tensor representing information about car manufacturing, one mode may indicate the types of different car components. Another mode may indicate the different car models in which a particular component is used. Yet another mode may indicate the cost of making a component. Another mode may indicate the average time it takes to make a component. Another mode may indicate average lifespan of a component. Yet another mode may indicate average number of curable defects occurring in a component.

In another tensor representing health-related data at a hospital, one mode may represent dates. Another mode may represent kinds of ailments that are being treated on a particular day. Another mode may represent the severity of the ailments. Yet another mode may represent a total number of physicians trained to attend to particular ailment, while another mode may represent the number of such physicians in attendance on a particular day. Another mode may represent average time spent by a physician in attending to a particular ailment. Yet another mode may indicate physicians available on call. It should be understood that these examples are illustrative only and that these data can be represented using additional and/or different attributes, resulting in additional and/or different modes. In general, data used in any kind of analysis, such as scientific analysis, structural analysis, economic analysis, social-behavior analysis, environment analysis, analysis of data related to astronomy, etc., can be represented in the form of a suitable tensor.

Data analysis can answer questions about the data such as is there a correlation between the cost of a car component and the number of defects therein or, must a hospital increase the number of physicians, e.g., orthopedic surgeons, in attendance, to provide adequate care. Again, these analysis are illustrative only and it should be understand that a large number of, and a diverse range of analysis can be performed using large datasets represented as tensors. To facilitate such analysis, tensors are often decomposed into several tensor components. A tensor component can be an array or a vector, a matrix, another tensor, or another suitable data structure. CANDECOMP/PARAFAC (CP) decomposition and Tucker decomposition are two commonly employed techniques for tensor decomposition. In some cases, maximum useful information can be extracted from a tensor when the number of components into which the tensor is decomposed is optimized. In many cases, the greater the number of components into which a tensor is decomposed the more the information that can be extracted from the tensor. Often, however, not all tensor components contain information that is of interest to an analyst.

Determining the maximum or optimum number of tensor components can be intractable. In other words, given a tensor of a practical size that is required to represent the collected data, a computer programmed to determine the optimum/maximum number of components and/or to perform such decomposition can run out of memory, processing capacity, and/or available run time and, as such, fail to perform tensor decomposition. In situations where the problem is not intractable, the ever-increasing need for higher performance and/or the need to minimize energy/power consumption can render the conventional tensor decomposition techniques unsuitable. Some techniques that can improve the efficiency and/or performance of tensor decomposition include reordering of the operations involved in tensor decomposition and/or analyzing and taking advantage of tensor sparsity.

SUMMARY

Methods and systems described herein feature embodiments of a selective expansive recursive technique, that can improve the efficiency and/or performance of tensor decomposition. This technique can be used with CP, Tucker, and other tensor decomposition techniques, and can be used together with or instead of other techniques (e.g., operation reordering, storage based on sparsity, etc.), for improving the tensor decomposition efficiency and/or performance. The conventional tensor decomposition process generally involves performing a single large decomposition of a tensor, and then selecting one or more components of interest for further analysis. Instead, in different embodiments of the selective expansive recursive technique, a tensor is decomposed into a specified number of components, whether the specified number is typically smaller than that optimum of maximum number of components, also called true rank of the tensor. One or more of these components may be selected for further recursive analysis.

In the recursive analysis, certain significant values (also called significant eigenscores) of a selected tensor component are identified. A sub-tensor is then formed by identifying from the tensor being decomposed the values that correspond to the significant eigenscores of the selected tensor component. The sub-tensor is typically smaller than the tensor being decomposed. The sub-tensor may then be decomposed into various components thereof, and one or more the components of the sub-tensor may be selected for further selective expansive recursive analysis. This process may be repeated for one or more additional components generated during the first and/or subsequent decompositions of tensors.

Various embodiments of the selective expansive recursive decomposition process can identify all tensor components or, alternatively, only those components that are more likely than others to reveal useful information about the data represented by the tensor. The components that are decomposed further, in a recursive manner, can be selected using the component weights, which can be determined by the decomposition that produced the components. Such selective expansion of one or more selected components can avoid several computations associated with the conventional decomposition and can therefore increase performance and/or efficiency of the overall decomposition. Moreover, in various embodiments, the sub-tensors that are decomposed further correspond only to the significant values/eigenscores of a component and, as such, the sub-tensors are generally smaller than the tensor being decomposed. This can also increase performance and/or efficiency of the overall decomposition.

Accordingly, in one aspect, a method is provided for decomposing tensors so as to facilitate extraction of information from the tensors. The method includes performing one or more iterations, where performing the first iteration includes: (a) decomposing a first tensor having N modes into a selected number (R) of tensor components. Each tensor component includes N vectors. The method also includes: (b) forming a second tensor (e.g., a sub-tensor) according to significant elements of a component. A significant element is an element that satisfies a specified criterion. The iteration including the steps (a) and (b) may be recursively repeated for the second tensor, and such iterations can be performed for one or more additional components from the R components generated or identified by the decomposition performed in the step (a) of an iteration.

Decomposing the first tensor into R tensor components may include decomposing the first tensor into N factor matrices, and generating a tensor component by selecting a particular column r from each of the N factor matrices. In some embodiments, decomposing the first tensor comprises performing CANDECOMP/PARAFAC (CP) decomposition. In these embodiments, each factor matrix has $I_n$ rows, where $I_n$ is the size of the first tensor in an n-th mode, and the number of columns of each factor matrix is equal to the selected number of components R. A weight may be associated with each of the R components, and the weight may be generated by the decomposition.

In some embodiments, decomposing the first tensor includes performing Tucker decomposition, where the selected number of components R includes a product of N component-size values, denoted $R_1, R_2, \ldots, R_N$. Each factor matrix in these embodiments has $I_n$ rows, where $I_n$ is the size of the first tensor in an n-th mode. The number of columns of each factor matrix is equal to the respective one of the N component-size values, i.e., $R_1, R_2, \ldots, R_N$. The Tucker decomposition also produces a core tensor G of dimensions $R_1 \times R_2 \times \ldots \times R_N$. As such, the core tensor G includes R elements.

With respect to the vectors of a component, in some embodiments a p-th element of a q-th vector of a tensor component corresponds to a tensor element of the first tensor having an index p in the q-th mode of the first tensor. The method may include selecting one or more significant elements from at least one of the N vectors. Forming the second tensor may include, for each significant element of the component, identifying a corresponding tensor element of the first tensor. In some embodiments, a single data structure is allocated to both the first and the second tensors, and forming the second tensor includes managing the data structure according to indices of the second tensor. Alternatively, forming the second tensor may include allocating a data structure to the second tensor that is different from a data structure allocated to the first tensor.

In some embodiments the method includes estimating an optimal decomposition rank for the first tensor, and selecting the number of components R that is less than the estimated optimal decomposition rank. A component may be selected from the R components according to a component weight generated during the decomposition. If Tucker decomposition is used, the component weight can be the value of the corresponding element of the core tensor G. In determining the significant elements of a component or a vector included in a component, the specified criterion may include one or of: membership in a set of a specified number of largest elements of the component; membership in a set of a specified number of largest elements of elements of a vector of the component; or an element having a value at least equal to a specified threshold.

In some embodiments, the method includes decreasing a number of modes of the second tensor to a value less than N. This can be achieved by selecting a mode of the second tensor, and collapsing tensor elements of the second tensor that correspond to the selected mode into a single combined tensor element of the second tensor. The method may also include redesignating the second tensor as the first tensor, and performing a second iteration, including repeating steps (a) and (b), with respect to the redesignated first tensor. The selected number of components R in the second iteration can be different from the selected number of components R in the first iteration. Additionally or in the alternative, the number of modes N of the first tensor in the second iteration can different from the number of modes N of the first tensor in the first iteration.

In some embodiments, the method includes generating the first tensor from an original tensor having M modes, wherein M>N. In these embodiments, generating the first tensor includes selecting a mode of the original tensor, and collapsing tensor elements of the original tensor that correspond to the selected mode of the original tensor into a single combined tensor element of the first tensor. The step of forming the second tensor may include increasing the number of modes of the second tensor up to a value M. This may be achieved by selecting a combined tensor element of the first tensor that corresponds to a significant element, and identifying each tensor element of the original tensor that correspond to the combined tensor element. The method may include decomposing the second tensor.

In another aspect, a system is provided for decomposing tensors so as to facilitate extraction of information from the tensors. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both.

The instructions in the first memory program the processing unit to: perform one or more iterations, wherein to perform the first iteration the instructions program the processing unit to: (a) decompose a first tensor having N modes into a selected number (R) of tensor components. Each tensor component includes N vectors. The instructions also program the processing unit to: (b) form a second tensor (e.g., a sub-tensor) according to significant elements of a component. A significant element is an element that satisfies a specified criterion. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to decompose tensors so as to facilitate extraction of information from the tensors. The instructions program the processing unit to: perform one or more iterations, wherein to perform the first iteration the instructions program the processing unit to: (a) decompose a first tensor having N modes into a selected number (R) of tensor components. Each tensor component includes N vectors. The instructions also program the processing unit to: (b) form a second tensor (e.g., a sub-tensor) according to significant elements of a component. A significant element is an element that satisfies a specified criterion. In various embodiments, the instructions can program the processing unit to perform one or more of the method steps described above.

BRIEF DESCRIPTION OF THE DRAWINGS

In the following description, various embodiments of the present invention are described with reference to the following drawings, in which:

FIG. 3A shows an example of a mapping between the indices of a sub-tensor and a tensor, according to one embodiment;

FIG. 3B shows an example of mode collapsing of the sub-tensor shown in FIG. 3A, according to one embodiment;

FIG. 4 schematically depicts a selective expansive recursive decomposition using CP decomposition, according to one embodiment; and FIG. 5 schematically depicts a selective expansive recursive decomposition using Tucker decomposition, according to one embodiment.

DETAILED DESCRIPTION

Tensor Decomposition

Figure 1:
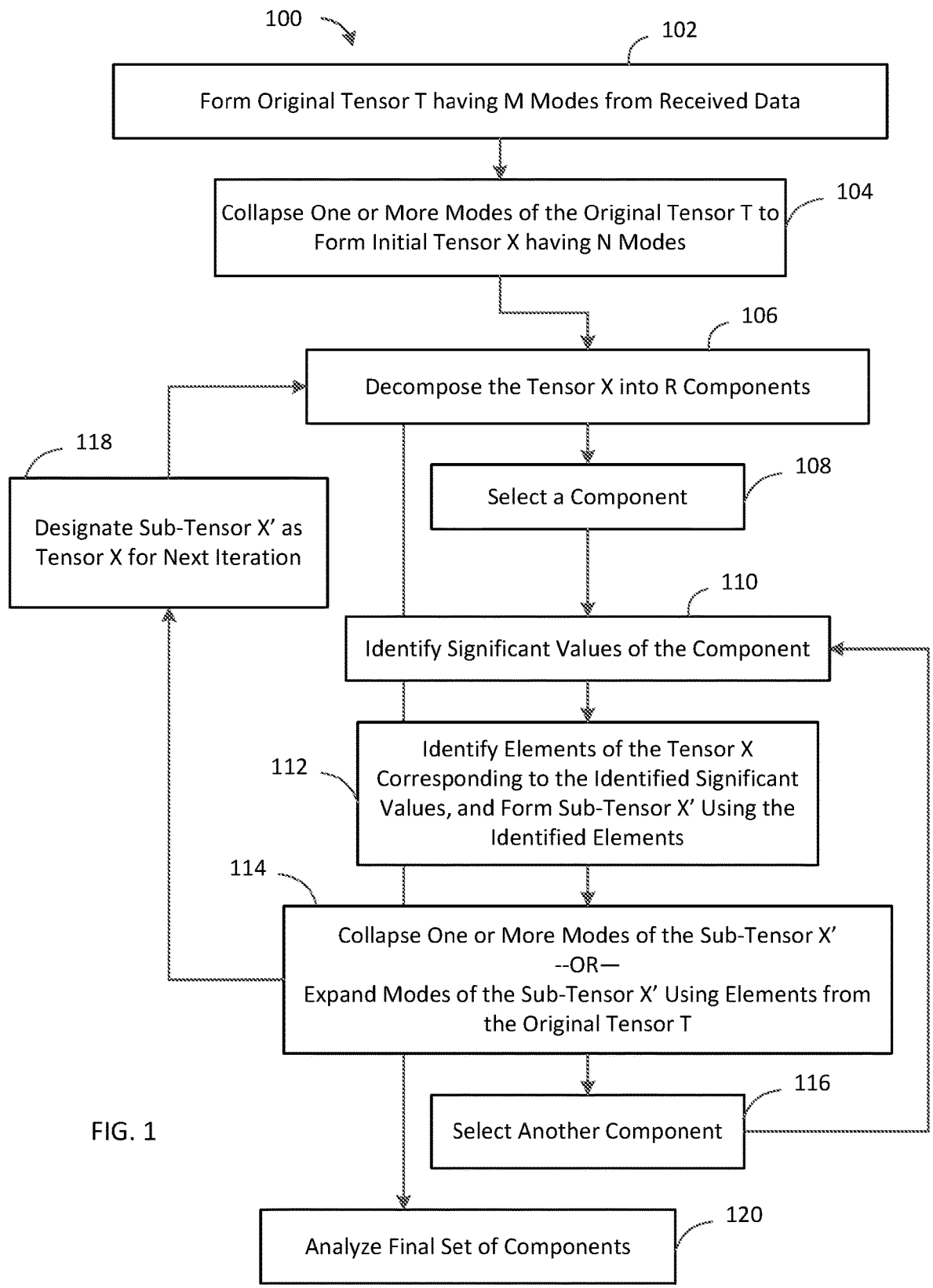
FIG. 1 is a flow chart of a selective expansive recursive process according to various embodiments.

Data is often associated with several aspects or attributes. Tensors (also known as multi-dimensional arrays) are often a natural fit for representing multi-aspect data. In the tensor parlance, each attribute or dimension of the data is generally referred to as a "mode" in the tensor. Tensor decompositions are important tools for exploratory analysis of increasing-in-size multi-dimensional data and for capturing the underlying multi-aspect structures/patterns in such large-scale higher-order data. There are two prominent tensor decomposition models—the CANDECOMP/PARAFAC (CP) model and Tucker model.

CP decomposition: The CP decomposition decomposes a tensor into a sum of component rank-one tensors (an N-way tensor is called a rank-one tensor if it can be expressed as an outer product of N vectors). In some embodiments, the CP decomposition that factorizes an input tensor X of size $S_1 \times S_2 \times \ldots \times S_N$ into R components (with factor matrices $A^{(1)} \ldots A^{(N)}$ and weight vector $\lambda$) is of the form:

$$X \approx \sum_{r=1}^{R} \lambda_r a_r^{(1)} \circ a_r^{(2)} \circ \ldots \circ a_r^{(N)}$$

where $a_r^{(n)}$ is the r-th column of the factor matrix $A^{(n)}$ of size $S_n \times R$, and the operator $\circ$ denotes an outer product.

The tensor is decomposed into R (a value usually specified by the user) components. Each component may identify a pattern in the data or a highly correlated cluster of information in the data. The weight vector $\lambda$ can identify the "energy" or the strength of the presence of each component in the data. Each entry in the factor matrices $A^{(1)} \ldots A^{(N)}$ represents an "eigenscore." For each of the R components, the top entries (eigenscores) in each vector $a_r^{(n)}$ are highly correlated entries. Groups of these highly correlated entries in each component can identify patterns or trends, abnormal or anomalous events, or changes in trends.

Tucker Decomposition: Here, the values $R_1, R_2, \ldots, R_N$ are generally specified by the user and the product of these values determines the total number of components resulting from the Tucker decomposition. A core tensor G provides indications on the correlations of different elements in different modes. More specifically, a large entry in G generally means a high correlation between the corresponding columns in all modes (i.e., corresponding columns in the factor matrices $A^{(n)}$). The top entries (eigenscores) in those columns (identified from an entry in G) tend to be highly correlated entries. As in the case of CP model, groups of these highly correlated entries in each component can identify widespread patterns or trends, or changes in trends. Typically, the computational complexity (both in time and memory usage) of the decomposition increases as the number of specified components increases.

Selective Expansion and Recursion

As described above, tensor decompositions can extract both widespread patterns and anomalies from large, high-dimensional datasets. Being an unsupervised learning technique, tensor decompositions do not require the user to specify a pattern to look for in advance—they find the behaviors "you didn't know you were looking for." However, this also means that the resulting components of the decompositions are not labeled in advance, so post-processing (usually by a domain expert) is often necessary to interpret the results.

For datasets having a low rank, neither the complexity of the decomposition nor the post-processing of the resulting components usually poses a significant burden. For datasets with a very large rank, both problems tend to be more difficult: (1) the time to complete a decomposition and the memory storage required can increase drastically with the rank, and (2) the burden on the user to look through hundreds or thousands of components in order to separate normal behaviors from anomalous ones can make manual analysis impractical.

If the user is only interested in studying the most important underlying patterns in the dataset, in many cases it is sufficient to underestimate the rank of the decomposition. This generally forces similar patterns, that would have otherwise been separated into individual components, to be grouped together. This can help elucidate large-scale patterns, but such grouping may not be useful in finding specific anomalous behaviors. Separating out these anomalous behaviors into their own components generally requires using a much larger rank that can lead to a substantial increase in complexity. In some cases, the decomposition problem can even become unsolvable using the available computing resources.

To combat this two-pronged problem, we have developed a selective expansive recursive approach to organizing the decomposition. Instead of initiating a single large decomposition and separating the normal components from the anomalous components from numerous components resulting from the decomposition, we "zoom in" on the data/tensor recursively.

Specifically, we decompose a tensor into a specified number of patterns, identified as the specified number of components. These patterns give a big-picture overview of the data contained within the tensor data structure. In order to study each individual pattern in greater detail, we form one or more new sub-tensors based on one or more selected components, and then decompose each of those sub-tensor(s) in turn. If component A describes one pattern within the data, the decomposition of the tensor corresponding to the component A can break that pattern down into more specific and focused patterns, which can be extracted by forming a sub-tensor corresponding to the component A, and by recursively decomposing that sub-tensor.

To this end, in the process 100 depicted in FIG. 1, data to be analyzed is compiled into a single tensor, T, called an original tensor, in step 102. The tensor T has M dimensions/modes of sizes $S_1, \ldots, S_M$ and respective index sets $I_1, \ldots, I_M$, where $I_d = \{1, 2, \ldots, S_d\}$ for the d-the mode. The index $I_d$ can also be described as $I_d = \{0, \ldots, (S_d-1)\}$. Each combination of indices from each index set e.g. ($i_1, i_2, \ldots, i_M$), where $i_d$ is a member of $I_d$, has a corresponding tensor entry $T(i_1, i_2, \ldots, i_M)$ that contains one of the original data points or values. The data value can be numerical, a string having one or more characters, or a combination of numerical value(s) and string(s).

In an optional step 104, one or more modes of the original tensor T are collapsed to form another tensor X, called an initial tensor. The number of modes of the initial tensor X is N, where N is less than M. Techniques for mode collapsing are generally known to those skilled in the art. The remainder of the process is described with reference to the initial tensor X. If the step 104 is not performed, the steps that use the initial tensor X can be performed using the original tensor T.

For a CP decomposition, a low-rank decomposition of the initial tensor X is performed in step 106. The rank (number of components) of the decomposition, designated R, may be selected depending on the diversity of the dataset such that the selected rank for decomposition is typically lower than the true rank of the tensor. The determination of the true rank of the tensor, i.e., the maximum number of components into which the tensor can be decomposed, can be an intractable problem, but the true rank can be estimated using techniques known to those skilled in the art.

In general, each one of the resulting R components represents a large-scale pattern in the dataset. A rank-R CP decomposition of the initial tensor X can produce R components each in the form: $\lambda_r (u_1^r \otimes u_2^r \ldots \otimes u_N^r)$, where $u_i^r$ is a vector of length $S_i$ describing the contribution of the dimension i to a particular component r, and $\lambda_r$ is the "weight" of the component r that generally indicates the volume of the initial tensor X that component r captures. A component can include additional and/or different vectors such as base-value and error vectors. In the case of Tucker decomposition, a decomposition is performed in the step 106 with low rank in every mode. Each element of the core tensor G would have a corresponding component in a form similar to that described above.

A vector $u_i^r$ generally includes values (also called eigenscores) that are produced by the decomposition process. In some embodiments, a value/eigenscore is considered to be significant if the value/eigenscore is greater than a specified threshold. The threshold can be any value such as (0.0001, 0.2, 0.6, 5; 30, 200, etc.). In some embodiments, the values that are less than the threshold values are called "zero" values/eigenscores and the values greater than or equal to the specified threshold are called "non-zero" values/eigenscores. In some embodiments, the largest K values of a component are considered to be the significant values. In some cases, the largest K values of each vector of a component are considered to be the significant values. The parameter K can be any number such as 1; 5; 15; 100; 2,500; etc.) The value of K can also be tens or hundreds of thousands, a few millions, etc.

A subset of the resulting components is selected for further analysis. In the first iteration, at least one component is selected and, in some cases, all of the R components are selected. In a subsequent iteration, one or more components generated in that iteration may be selected or, in some cases, none of the components may be selected to perform a further iteration, as described below. In the case of the CP decomposition, the components may be selected by weight. In the case of the Tucker decomposition we can choose one component vector from each factor matrix, and we can choose the vectors corresponding to the largest entries in the core tensor, as described with reference to FIG. 5.

In step 108, a component is selected and the significant values of the component are identified in step 110. The significant values/eigenscores can be identified as described above. A sub-tensor X' is then formed using the significant values, in step 112. In general, the sub-tensor X' can be formed by filtering the tensor X in each mode by only those indices having a non-zero eigenscore in the component or selected component vectors. In some embodiments, for a component in the form $\lambda_r (u_1^r \otimes u_2^r \ldots \otimes u_N^r)$ we form a sub-tensor as follows. For each dimension d, consider the vector $u_d^r$. For each element i in the index set $I_d$ there is a corresponding score $u_1^r(i)$ that describes the contribution of the index i to the selected component r.

In various embodiments, we create a new index set $I_d$ which contains only those indices j for which the value of $u_d^r(j)$ is significant, e.g., $u_d^r(j) > 0$. In some embodiments, we define a function $f(u_d^r(j))$ that determines whether or not j must be included in the new index set $J_d$. The size of a dimension/mode d is $S'_d$, where $S'_d$ is equal to the number of indices j for which $u_d^r(j) > 0$. We then create a new tensor X' having N dimensions/modes and index sets $I'_1, \ldots, I'_N$, where $I'_d = \{1, 2, \ldots, S'_d\}$ for the d-th mode. In some embodiments, an index set $I'_d$ can be described as $I'_d = \{0, 1, \ldots, (S'_d-1)\}$ for the d-the mode. For each tuple of indices $i'_2, i'_2, \ldots, i'_N$) for the new tensor X', where $i'_d \in I'_d$, for each $i'_d$, a mapping function determines the corresponding index $j_d$ of the tensor X along the d-th dimension/mode. As such, the new tensor X' can be defined as X'($i'_1$, $i'_2, \ldots, i'_N) = X(j_1, j_2, \ldots, j_N)$, where $i'_d \in I'_d$ and $j_d \in I_d \equiv \{1, 2, \ldots, S_d\}$. FIG. 3A shows an example of such a mapping.

The sub-tensor X' and the tensor X are different logical entities. In some embodiments, these two tensors are different physical entities, as well. As such, the tensor X may be stored at one set of locations in the memory using one instance of a data structure, and the tensor X' may be stored at another set of locations in the memory using another instance of the same data structure or using a different data structure. The data structure(s) can be tensor structures, groups of lists, arrays, vectors, etc. In these embodiments, in forming the tensor X', elements of the tensor $X(j_1, j_2, \ldots, j_N)$ are copied into the other instance of the data structure or into another data structure, where they can be accessed using the index tuples $X'(i'_1, i'_2, \ldots, i'_N)$.

In some embodiments, even though the sub-tensor X' and the tensor X are different logical entities, a single physical tensor represents both the sub-tensor X' and the tensor X. In these embodiments, accessing an element of X' identified by the index tuple $X'(i'_1, i'_2, \ldots, i'_N)$ simply involves mapping that tuple to the index tuple $X(j_1, j_2, \ldots, j_N)$. Techniques for copying elements of one tensor to another tensor, and for implementing two or more different logical tensor using a single physical tensors and for providing the required mapping are generally known to those skilled in the art.

After the sub-tensor X' of mode N is formed in the step 112, the number of dimensions/modes thereof can be decreased or increased in an optional step 114. In order to decrease the number of modes of the sub-tensor X', one or more modes of the sub-tensor X' are collapsed. Techniques for mode collapsing are generally known to those skilled in the art, and an example of mode collapsing is described with reference to FIG. 3B. Recall, that in the optional step 104, one or more modes of the original tensor T may be collapsed while generating the tensor X. In some embodiments, after the sub-tensor X' is formed, it can be expanded by adding thereto one or more dimensions/modes. The tensor elements to be added for an additional mode to be included can be obtained from the original tensor T.

In some embodiments, the expansion can be performed by expanding each index tuple of the sub-tensor with a respective index for each new dimension/mode to be added. To illustrate, assume that mode k of size $S_k$ of the original tensor T was collapsed to form the tensor X. Therefore, the elements of the sub-tensor X' prior to the expansion thereof can be identified as:

$$X'(i'_1, \ldots, i'_{k-1}, i'_{k+1}, \ldots, i'_N) = X(j_1, \ldots, j_{k-1}, j_{k+1}, \ldots, j_N)$$

The value of each element $X(j_1, \ldots, j_{k-1}, j_{k+1}, \ldots j_N)$ is an aggregate, according to a particular aggregation function, of the $S_k$ values: $X(j_1, \ldots, j_{k-1}, j_{k+1}, \ldots j_N)(j_k)$, where $j_k = \{1, \ldots, S_k\}$ or $j_k = \{0, (S_k-1)\}$. The aggregation function can be sum, max, average, median, etc., and the aggregation techniques used with mode collapsing are generally known to those skilled in the art. After the expansion, the elements of the sub-tensor X' can be identified using the original tensor T as:

$$X'(i'_1, \ldots i'_{k-1}, i'_k, i'_{k+1}, \ldots, i'_N) = T(j_1, \ldots, j_{k-1}, j_k, j_{k+1}, \ldots, j_N)$$

Mode expansion can increase the types of patterns that can be extracted in the next iteration.

Recall, in the step 108 one of the R components that were generated during the decomposition performed in the step 104 was selected. A sub-tensor X' corresponding to the selected component was formed in the step 112, and its number of modes was decreased or increased in the optional step 114. In optional step 116, another component from the R components generated or identified in the step 106 can be selected. If such an additional component is selected, the steps 110 and 112 are performed using that other component and another sub-tensor X' corresponding to the additionally selected component may be formed. The number of modes of the other sub-tensor X' may be decreased or increased in the optional step 114. The steps 110-114 may be performed for yet another component selected again in the step 116 and, in some cases, the steps 110-114 are performed for each of the R components, resulting in R sub-tensors. The first iteration of the process 100 thus includes forming one or more sub-tensors X'.

One or more sub-tensors X' formed in the first iteration can be processed further in a recursive manner in subsequent iterations. To this end, a sub-tensor X' is designated as the tensor X in step 118, and one or more of the steps 106 through 116 can be repeated for the tensor X, which is a sub-tensor from a previous iteration, except for the first iteration. In some cases, in a subsequent iteration, the tensor X is decomposed into R components in the step 106. The value of R in a later iteration can be the same as or different from the value of R used in a previous iteration.

One or more of the components generated in the subsequent iteration are selected in steps 108 and 116, and a sub-tensor corresponding to each selected component is generated in the steps 110, 112, and optionally modified in the step 114. Each of these sub-tensors may be re-designated as the tensor X in the step 118, and can be analyzed recursively as described herein. In some cases, if none of the components generated in the step 106 of a second or later iteration is selected, the recursion terminates. The final set of components may be analyzed to extract information about the dataset in the step 120. Techniques for such analysis are generally known to those skilled in the art. In general, the recursive process 100 may terminate when no components are selected for further analysis. This typically occurs when either: (1) no resulting component is expected to reveal behavior of further interest to the user, or (2) the decomposition of the sub-tensor is believed to be close to the true rank of the sub-tensor and further recursive analysis is unlikely to provide additional information.

The process 100 can provide a positive tradeoff between precision and the sum of both computational complexity and user effort. That is, fine-grained characteristics of interest can be recovered with less total computational and user effort. In some cases, the tradeoff is decisive in terms of whether certain behaviors are feasibly recoverable with tensor decomposition techniques. In other words, a conventional nonrecursive decomposition of a given original tensor may be infeasible given a certain processor-memory configuration, but the selective expansive recursive decomposition according to the process 100 may be feasible using the same processor-memory configuration.

Figure 2:
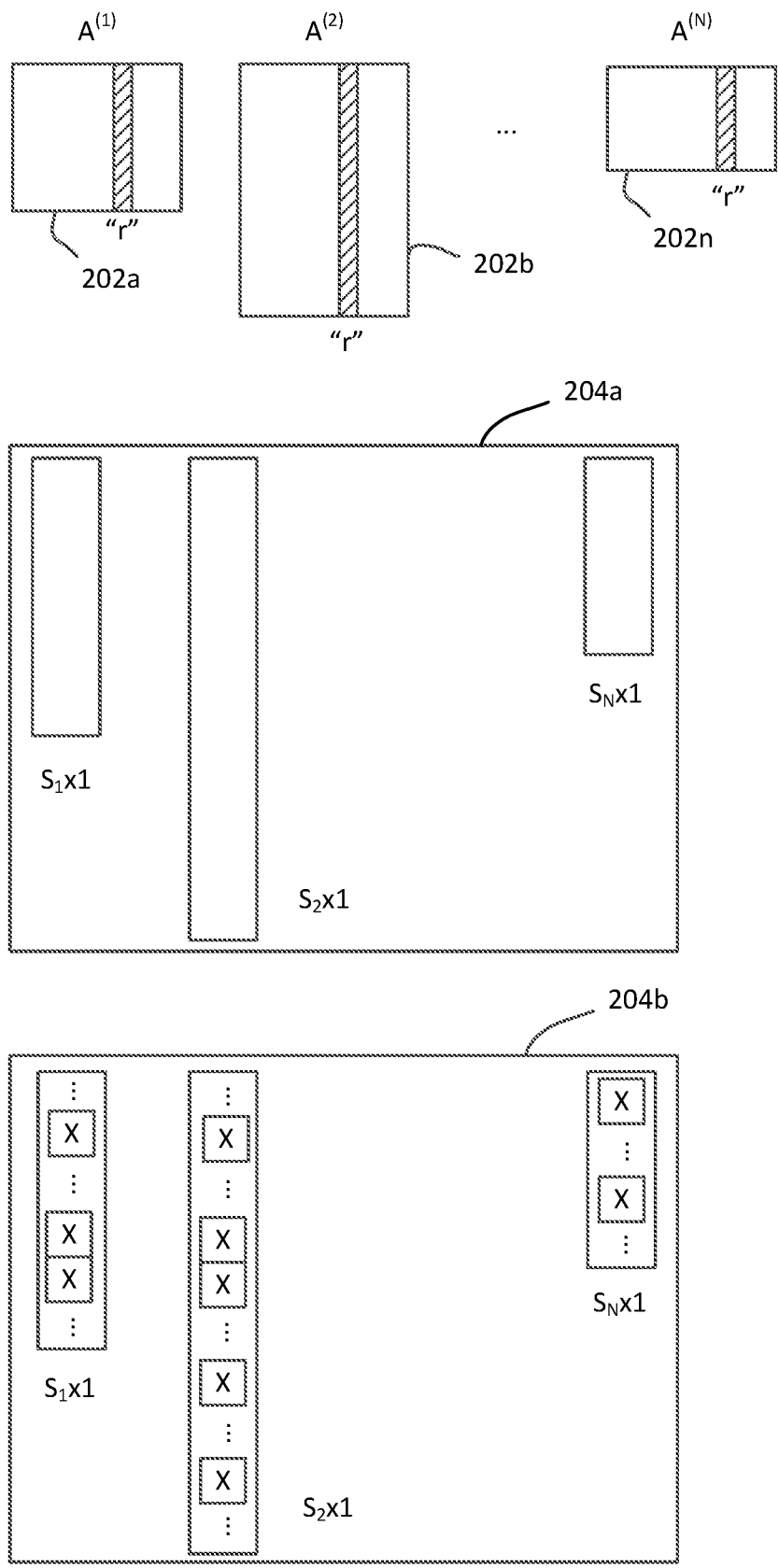
FIG. 2 depicts an example component and significant elements thereof, according to one embodiment.

With reference to FIG. 2, a tensor X has N modes, and the sizes of the modes are $S_1, \ldots, S_N$. All modes can have different sizes or one or more modes can have the same size as another mode. In some embodiments, the decomposition of the tensor X into R components involves generating R factor matrices: $A^{(1)}, A^{(2)}, \ldots, A^{(N)}$. The sizes of these factor matrices, respectively, are: $S_1 \times R$; $S_2 \times R$; $\ldots$; $S_N \times R$. These matrices 202a, 202b, ..., 202n can be stored in the memory using any suitable data structure such as arrays, lists, vectors, matrices, etc., and the matrices may be stored in a transposed format, where the size of the k-th factor matrix would be $R \times S_k$.

In general, the r-th component, shown as 204a, can be formed by selecting the r-th column of each factor matrix or the r-th row of each transposed factor matrix. The sizes of the columns are: $S_1 \times 1$; $S_2 \times 1$; ...; $S_N \times 1$. Therefore, an element of the r-th component can be identified using the index tuple $(i_1, i_2, \ldots, i_N)$, where $i_k \in [1, S_k]$ or $i_k \in [0, (S_k-1)]$. As discussed above, one or more of the elements (also called values or eigenscores) of the r-th component are determined to be significant (also called non-zero). In FIG. 2, such elements are marked "X" in the r-th component, also shown as 204b. In various embodiments, the significant elements are used to form the sub-tensor X', as discussed above with reference to FIG. 1.

FIG. 3A illustrates an example mapping between the indices of a sub-tensor X' and a tensor X. Suppose the tensor X has three modes (N=3), and that the sizes of each mode are: $S_1=10$; $S_2=20$; $S_3=5$; and $S_4=8$. Suppose the tensor X was decomposed into three components, one of which, component $C_1$, was selected for further analysis. Further assume that the component $C_1$ has three significant elements in modes 1 and 2, each; two significant elements in mode 3, and one significant element in mode 4. Therefore, the sizes of the modes of the sub-tensor are: $S'_1=3$; $S'_2=3$; $S'_3=2$; and $S'_4=1$. Also assume that the indices of the significant elements of the component $C_1$, in mode 1, are 1, 4, and 7; the indices of the significant elements in mode 2 are 2, 3, and 12; the indices of the significant elements in mode 3 are 5 and 6; and the index of the significant element in mode 4 is 8. A mapping between the indices of the sub-tensor X' and the tensor X is shown in FIG. 3A.

With reference to FIG. 3B, collapsing of mode 3 of the sub-tensor X' shown in FIG. 3A is described. In this example, a different 3-mode tensor X" is generated during collapsing, which may be re-designated as the sub-tensor X', which may be subsequently re-designated as the tensor X for the next iteration. The tensors X" and X' can be different logical entities but may be implemented using a single physical tensor. In forming the tensor X", the values of the tensor X' corresponding to the index tuples $(i'_1, i'_2, 1, i'_4)$ and $(i'_1, i'_2, 2, i'_4)$ are merged into a single value. These values can also be identified in the tensor X by the index tuples $(j_1, j_2, 5, j_4)$ and $(j_1, j_2, 6, j_4)$. The merging can be performed according to a suitable aggregation function such as sum, max, average, median, etc. The aggregation techniques used in tensor mode collapsing are generally known to those skilled in the art.

With reference to FIG. 4, a three-mode tensor 402 is decomposed in a selective expansive recursive manner using CP decomposition. For a specified number of components R, the tensor 402 is first decomposed into three factor matrices 406a, 406b, 406c, corresponding respectively to the modes 1, 2, and 3 of the tensor 402. These factor matrices are in a form R rows and $S_d$ columns, where $S_d$ is the size of the d-th mode of the tensor 402. In this example, the size of all three modes is the same but, in general in an N-mode tensor, the size of one or more modes can be different from the size of another mode. The decomposition of the tensor 402 into three factor matrices also produces R component weights indicated by the vector λ 404. According to these weights, two components, namely, "a" and "b," are determined to be important to the extraction of useful information. In some embodiments, the components having the largest K weights for a specified K are selected for further analysis. The value of K can be any number in the range [1, R] for the first iteration, and any number in the range [0, R] for the subsequent iterations. In some embodiments the components having a weight equal to or greater than a specified threshold weight are selected for further analysis.

In order to form the component $A^{CP}$, the respective a-th row from each factor matrix 406a-406c is selected. The a-th row of the factor matrix 406a forms dimension/mode 1 referred to as dimension/mode 408 of the component $A^{CP}$. Likewise, the respective a-th rows of the factor matrices 406b, 406c form dimensions/modes 2 and 3, referred to respectively, as dimensions/modes 412, 416 of the component $A^{CP}$. As discussed above, not all values (also called eigenscores) of the component $A^{CP}$ are significant (also called non-zero). In this example, the values/eigenscores 410a, 410b, 410c of mode 1 of the component $A^{CP}$ are significant. Similarly, the values/eigenscores 414a, 414b of mode 2, and the value 418a of mode 3 of the component $A^{CP}$ are significant. Using the indices of these significant/non-zero eigenscores, a sub-tensor 420 is formed. The sub-tensor 420 can be optionally modified by increasing or decreasing its number of modes, and can be recursively decomposed, as described above with reference to FIG. 1.

Referring again to FIG. 4, the component $B^{CP}$ is formed by selecting the respective b-th row from each factor matrix 406a-406c. The b-th row of the factor matrix 406a forms dimension/mode 1 referred to as dimension/mode 422 of the component $A^{CP}$. Likewise, the respective b-th rows of the factor matrices 406b, 406c form dimensions/modes 2 and 3, referred to respectively, as dimensions/modes 426, 430 of the component $B^{CP}$. The value/eigenscore 424a of mode 1 of the component $B^{CP}$ is significant. Similarly, the values/eigenscores 428a, 428b, 428c of mode 2 and the values 432a, 432b, 432c of mode 3 of the component $B^{CP}$ are significant. Using the indices of these significant eigenscores another sub-tensor 434 is formed. The sub-tensor 434 can be optionally modified by increasing or decreasing its number of modes, and can be recursively decomposed, as described above with reference to FIG. 1.

With reference to FIG. 5, a three-mode tensor 502 is decomposed in a selective expansive recursive manner using Tucker decomposition. For a specified number of components $R=R_1 \times R_2 \times R_3$, the tensor 502 is first decomposed into a core tensor G of dimensions $R_1 \times R_2 \times R_3$ and three corresponding factor matrices 506a, 506b, 506c, corresponding respectively to the modes 1, 2, and 3 of the tensor 502. These factor matrices are in a form R rows and $S_d$ columns, where $S_d$ is the size of the d-th mode of the tensor 502. In this example, the size of all three modes is the same but, in general in an N-mode tensor the size of one or more modes can be different from the size of another mode. The core tensor G includes $R=R_1 \times R_2 \times R_3$ elements and a tensor component corresponding to each of these elements can be formed, producing a total of R components.

In this example, two of the R elements of the core tensor G, i.e., elements 504a, 504b are determined to be significant, i.e., important to the extraction of useful information. As such, two components will be formed for further analysis. In some embodiments, the elements having the largest K values for a specified K are determined to be significant, where $K \in [1, R]$ for the first iteration and $K \in [0, R]$ for the subsequent iterations. In some embodiments, the elements having a value equal to or greater than a specified threshold value are determined to be significant. The indices of the element 504a are (a, b, c) and the indices of the element 504b are (d, e, f). These indices are used in forming two components $A^T$ and $B^T$ corresponding to the elements 504a, 504b, respectively.

In forming the component $A^T$, the a-th row of the factor matrix 506a forms dimension/mode 1 of the component $A^T$.

Similarly, the b-th row of the factor matrix 506b, and the c-th row of the factor matrix 506c respectively form the dimensions/modes 2 and 3 of the component $A^T$. As discussed above, not all values (also called eigenscores) of the component $A^T$ are significant (also called non-zero). In this example, the values/eigenscores 510a-510c and 510d of mode 1 of the component $A^T$ are significant. Similarly, the values/eigenscores 514a, 514b of mode 2 and the value 518a of mode 3 of the component $A^T$ are significant. Using the indices of these significant/non-zero eigenscores a sub-tensor 520 is formed. The sub-tensor 520 can be optionally modified by increasing or decreasing its number of modes, and can be recursively decomposed, as described above with reference to FIG. 1.

Referring again to FIG. 5, the component $B^T$ is formed by selecting the d-th row from the factor matrix 506a, the e-th row from the factor matrix 506b, and the f-th row from the factor matrix 506c. The d-th row of the factor matrix 506a forms the dimension/mode 1, the e-th row of the factor matrix 506a forms the dimension/mode 2, and the f-th row of the factor matrix 506a forms the dimension/mode 3 of the component $A^T$. The value/eigenscore 524a of mode 1 of the component $B^T$ is significant. Similarly, the values/eigenscores 528a-528d of mode 2 and the values 532a, 532b, 532c of mode 3 of the component $B^T$ are significant. Using the indices of these significant eigenscores another sub-tensor 534 is formed. The sub-tensor 534 can be optionally modified by increasing or decreasing its number of modes, and can be recursively decomposed, as described above with reference to FIG. 1.

For the simplicity of illustration, a three mode tensor is used in the foregoing examples, and the formations of two components and the two corresponding sub-tensors are described. In general, the number of modes of a tensor can be any number such as 1, 2, 5, 8, 15, 46, 75, 115, etc. The number of components selected for further analysis in each iteration of the recursive process can be any number such as 0, 1, 4, 10, 35, 80, 130, etc. The sizes of different modes can be different and the size of a mode can be relatively small (e.g., up to 10), a few tens, hundreds, or thousands, or can be relatively large (e.g., hundreds of thousands, a few millions, tens of millions, etc.). Similarly, the total number of eigenscores determined to be significant and/or the number eigenscores in each mode that are determined to be significant can be any number, e.g., up to 10, a few tens, hundreds, thousands, or hundreds of thousands, a few millions, etc.

In different embodiments, in different iterations, the formation of the components, the formation of the corresponding sub-tensors, and further decomposition of the sub-tensors can occur in different orders. For example, after a component (e.g., the component $A^{CP}$) is formed in the first iteration, the corresponding sub-tensor is formed and decomposed recursively in one or more additional iteration before another component (e.g., the component $B^{CP}$) of the first iteration is formed. In some embodiments, in one iteration, a component and its corresponding sub-tensor are formed. Then the next component of that iteration and its corresponding sub-tensor are formed, and this process is repeated until all or some of the components of that iteration and the corresponding sub-tensors are formed. Then, recursive decomposition is performed for each sub-tensor. In some embodiments, all or some components of an iteration are formed. Then the corresponding sub-tensors are formed, and then the sub-tensors are decomposed recursively. In any of these embodiments, the iterations of recursive decomposition can be interleaved with other operations, such as the formation of components and/or sub-tensors from other iterations.

Example: Network Traffic Tensor

To illustrate the process above, consider a dataset that includes logs containing millions of messages sent over a network. Dozens of columns of information are typically collected per message including message timestamp, Internet Protocol (IP) addresses, ports, protocol, service, bytes sent and received, duration of the connection, etc. First we built an original tensor from the whole dataset. We then built an initial tensor having fewer modes than the original tensor, using only the most important columns/attributes of data. For example, message timestamp, sender IP address, receiver IP address, and receiver port. Considering that network traffic is both high volume and likely includes many diverse behaviors, the true rank of the full tensor was expected to be large, e.g., greater than 50.

We performed a low-rank decomposition, i.e., a decomposition into five components. Each resulting component represented one large-scale pattern of network traffic. One component contained substantially all (e.g., more than 50%, 70%, 80%, 95%, etc.) DNS traffic, for example, and another contained substantially all (e.g., more than 50%, 70%, 80%, 95%, etc.) web traffic. From the point of view of cybersecurity, the vast majority of the traffic in each component was likely benign. In other words, no single component readily represented malicious behavior. We suspected, however, that a malicious hijacking of DNS may be contained within the DNS component. After decomposing the dataset/tensor into five components corresponding to five main categories of network traffic, further decompositions "zoomed in" on the behavior of interest.

The DNS component included a large number (millions) of DNS messages along with some other traffic strongly correlated with DNS traffic. The indices with non-zero eigenscores corresponded to a sub-tensor of the original tensor. This new subset of the data included only the senders, receivers, etc. that are present within the DNS feature. In our experiment, we increased the number of modes of the newly formed sub-tensor, augmenting the sub-tensor with DNS specific data, such as DNS query strings, query types, and other relevant information, obtained from the originally created tensor We then performed a new decomposition using another relatively low rank, 10. The 10 components generated in the second iteration generally represented more specific behaviors than the five components generated during the first iteration. Each of these 10 components represented a sub-pattern of DNS traffic, such as internal DNS traffic from Linux machines, internal DNS traffic from machines with a certain operating system, DNS queries about system machines and services, DNS queries regarding website URLS, non-standard uses of DNS, and potentially malicious attempts to hijack DNS. We then selected the non-standard uses of DNS component and performed yet another low-rank decomposition to break down the non-standard uses of DNS activity into more specific sub-groupings. In general, the sub-patterns of DNS traffic having large volumes, can be decomposed recursively.

Compared to traditional (non-tensor-based) unsupervised learning approaches, various embodiments described herein facilitate decomposition that can reveal both large-scale patterns and fine-grained anomalies across different levels of resolution, regardless of the domain from which the data is collected. Some embodiments can be used to detect anomalous activity "hidden" amongst normal activity. Using the conventional non-tensor-based techniques, such obscured anomalous activity often cannot be detected because many of those techniques examine only two dimensions of the data at a time. For instance, in the network traffic example, looking at only two dimensions at a time, it would be possible to distinguish DNS traffic from the other large groupings of traffic, but it would not be possible to distinguish subtle differences detectable in a higher-dimensional space, e.g., complicated patterns between number of bytes received, DNS query, and message timestamp.

In many experiments, various embodiments described herein vastly outperformed several conventional tensor decomposition techniques that generally aim to decompose a tensor according to its true rank. In terms of performance, in one experiment the decomposition of a tensor with 30 million entries using a convention technique implemented on a processing system having 96 processor cores required several hours. According to one embodiment employing the selective expansive recursive decomposition, one iteration of tensor decomposition using the same processing system was performed in less than 60 seconds. Therefore performing several (e.g., a dozen, in one experiment) such iterations still required fewer total computing cycles and processing time. Embodiments of the selective expansive recursive technique can also save analyst time, avoiding or minimizing the requirement to manually inspect hundreds of components, by zooming in on specific components, likely corresponding to areas of interest.

Some other nonrecursive low-rank (i.e., less than the true tensor rank) tensor decompositions may require fewer computing resources than some embodiments of the selective expansive recursive technique. These other nonrecursive low-rank systems, however, generally lack the ability to extract anomalies that remain obscured within larger patterns. Furthermore, even sophisticated post-processing of the decomposition results obtained using a nonrecursive low-rank decomposition system generally precludes the ability to add more specific information at a later time. For instance, in the network tensor example, it is generally not feasible to include several DNS specific dimensions/modes while performing a non-recursive low-rank decomposition. These additional dimensions can be critical to finding subtle anomalies, and can be included in one or more subsequent iterations of the embodiments of the selective expansive recursive technique.

Various hierarchical tensor decomposition techniques are fundamentally different from our selective expansive recursive tensor analysis technique. Hierarchical tensor decomposition is generally understood to be a way to combat the curse of dimensionality for the dense core tensor output of a Tucker decomposition. By taking advantage of a naturally hierarchical structure of a problem, the hierarchical technic typically builds a tree of 3-dimensional tensors instead of a single N-dimensional core tensor, where N can be greater then 3. In this approach, the decomposition may at most consider three tensor dimensions/modes at a time and, as such, important patterns in the dataset may not be revealed until the number of components approximately equal to the true rank of the tensor are formed. Embodiments of selective expansive recursive tensor decompositions can "zoom in" on a particular feature of interest within a data set and can produce specific results.

Unlike any generic operations such as parsing, etc., unlike usual computer functions such as storage and access of information, and unlike any ordinary mathematical or mental processes such as comparing and categorizing information, the unconventional operations involved in various embodiments of selective expansive recursive decomposition, as described herein, are specifically orchestrated. In particular, operations such as selecting one or more components for further processing from the components generated in an iteration, identifying significant eigenscores in a component, and forming a sub-tensor using only the significant eigenscores are highly novel and uncommon operations. These novel and uncommon operations allow a computing system to perform tensor decomposition where such decomposition may be infeasible using a conventional decomposition technique. In some cases, tensor decomposition can be achieved in relatively less time, requiring relatively less processing capacity and/or memory, and/or by consuming relatively less power and/or energy compared to a conventional system. As such, various embodiments described herein can improve specialized computer systems used in data analysis.

Moreover, the techniques described herein are deeply rooted in computing systems. In particular, the values of various parameters of a selective expansive recursive process can be selected such that performing tensor decomposition does not become infeasible for an available computing system. For example, parameters such as the total number of iterations and/or the number components to be selected in each iteration can be selected based on, at least in part, system parameters such as the number of available processors, processing speed, energy/power consumption budget, etc. Parameters such as the threshold used in one or more iterations for distinguishing between significant and non-significant eigenscores, the number of significant eigenscores to be used in forming a sub-tensor, the number of modes of a sub-tensor, etc., can be determined based on, at least in part, system parameters such as available computation time, memory capacity at a particular level of memory (e.g., cache, L1, local memory, etc.).

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for facilitating extraction of information from tensors, the method comprising:
    performing a first iteration by a processor, the first iteration comprising:
    (a) decomposing a first tensor having N modes into a selected number (R) of tensor components, each tensor component comprising N vectors; and
    (b) forming a second tensor according to significant elements of a component, selected from the R components according to a component weight generated during the decomposition, a significant element being an element that satisfies a specified criterion, and forming the second tensor comprises:
        identifying tuples of N indices formed by indices corresponding to one or more significant elements of the selected component in each of the N modes;
        selecting elements of the first tensor corresponding to the identified one or more tuples of N indices, wherein the count of the selected elements is S;
        allocating processor-accessible memory for the second tensor, of size proportional to N×S; and
        storing the selected elements in the allocated processor-accessible memory.

2. The method of claim 1, wherein decomposing the first tensor into R tensor components comprises:
    decomposing the first tensor into N factor matrices; and
    generating a tensor component by selecting a column r from each of the N factor matrices.

3. The method of claim 2, wherein:
    decomposing the first tensor comprises performing CANDECOMP/PARAFAC (CP) decomposition; and
    each factor matrix has: (i) $I_n$ rows, $I_n$ being a size of the first tensor in an n-th mode, and (ii) a number of columns equal to the selected number of components R.

4. The method of claim 2, wherein:
    decomposing the first tensor comprises performing Tucker decomposition;
    the selected number of components R comprises a product of N component-size values; and each factor matrix has: (i) $I_n$ rows, $I_n$ being a size of the first tensor in an n-th mode, and (ii) a number of columns equal to a respective one of the N component-size values.

5. The method of claim 1, wherein a p-th element of a q-th vector corresponds to a tensor element of the first tensor having an index p in the q-th mode of the first tensor.

6. The method of claim 1, further comprising selecting one or more significant elements from at least one of the N vectors.

7. The method of claim 1, wherein forming the second tensor comprises:
for each significant element of the component, identifying a corresponding tensor element of the first tensor.

8. The method of claim 1, wherein:
a single data structure is allocated to both the first and the second tensors; and
forming the second tensor comprises managing the data structure according to indices of the second tensor.

9. The method of claim 1, wherein forming the second tensor comprises allocating a data structure to the second tensor that is different from a data structure allocated to the first tensor.

10. The method of claim 1, further comprising:
estimating an optimal decomposition rank for the first tensor; and
selecting the number of components R that is less than the estimated optimal decomposition rank.

11. The method of claim 1, wherein:
decomposing the first tensor comprises performing Tucker decomposition; and
the component is selected from the R components according to a value of an element of a core tensor G generated during the Tucker decomposition.

12. The method of claim 1, wherein the specified criterion comprises at least one of:
membership in a set of a specified number of largest elements of the component;
membership in a set of a specified number of largest elements of elements of a vector of the component; and
an element having a value at least equal to a specified threshold.

13. The method of claim 1, further comprising decreasing a number of modes of the second tensor to a value less than N by:
selecting a mode of the second tensor; and
collapsing tensor elements of the second tensor that correspond to the selected mode into a single combined tensor element of the second tensor.

14. The method of claim 1, further comprising:
redesignating the second tensor as the first tensor; and
performing a second iteration, comprising repeating steps (a) and (b), with respect to the redesignated first tensor.

15. The method of claim 14, wherein the selected number of components R in the second iteration is different from the selected number of components R in the first iteration.

16. The method of claim 14, wherein the number of modes N of the first tensor in the second iteration is different from the number of modes N of the first tensor in the first iteration.

17. The method of claim 1, further comprising:
generating the first tensor from an original tensor having M modes, wherein M>N, generating the first tensor comprising:
selecting a mode of the original tensor; and
collapsing tensor elements of the original tensor that correspond to the selected mode of the original tensor into a single combined tensor element of the first tensor.

18. The method of claim 17, wherein:
the step of forming the second tensor comprises increasing a number of modes of the second tensor up to a value M, by:
selecting a combined tensor element of the first tensor that corresponds to a significant element; and
identifying each tensor element of the original tensor that correspond to the combined tensor element.

19. The method of claim 1, further comprising decomposing the second tensor.

* * * * *